US008700243B2

(12) United States Patent
Kamijo

(10) Patent No.: US 8,700,243 B2
(45) Date of Patent: Apr. 15, 2014

(54) VEHICLE CONTROL DEVICE

(75) Inventor: Yusuke Kamijo, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 115 days.

(21) Appl. No.: 13/512,791

(22) PCT Filed: Sep. 12, 2011

(86) PCT No.: PCT/JP2011/070771
§ 371 (c)(1),
(2), (4) Date: May 30, 2012

(65) Prior Publication Data
US 2013/0066494 A1 Mar. 14, 2013

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......... 701/22; 701/112; 180/65.265; 903/903

(58) Field of Classification Search
USPC ............ 701/22, 112, 68, 115, 113, 67, 51, 54, 701/102, 103, 101, 99, 106; 180/65.265, 180/65.21, 282, 65.285, 65.28
See application file for complete search history.

(56) References Cited

U.S. PATENT DOCUMENTS

| | | | | |
|---|---|---|---|---|
| 6,650,993 | B2* | 11/2003 | Wolf et al. | 701/112 |
| 6,802,291 | B2* | 10/2004 | Ujifusa | 123/179.4 |
| 6,839,621 | B2* | 1/2005 | Kaneko | 701/112 |
| 6,941,218 | B2* | 9/2005 | Wolf et al. | 701/112 |
| 7,027,911 | B2* | 4/2006 | Nishikawa et al. | 701/112 |
| 7,079,939 | B2* | 7/2006 | Kataoka et al. | 701/112 |
| 7,127,337 | B2* | 10/2006 | Bennett et al. | 701/22 |
| 7,177,755 | B2* | 2/2007 | Nishikawa et al. | 701/112 |
| 7,269,499 | B2* | 9/2007 | Murakami et al. | 701/112 |
| 7,415,350 | B2* | 8/2008 | Nishikiori | 701/112 |
| 7,558,666 | B2* | 7/2009 | DiGonis | 701/112 |
| 7,610,143 | B1* | 10/2009 | Boesch | 701/112 |
| 7,653,478 | B2* | 1/2010 | Park | 701/112 |
| 7,797,099 | B2* | 9/2010 | Terada | 701/112 |
| 7,809,493 | B2* | 10/2010 | Adachi | 701/112 |
| 7,869,932 | B2* | 1/2011 | Boesch | 701/112 |
| 7,933,711 | B1* | 4/2011 | Ulrey et al. | 701/112 |
| 7,937,212 | B2* | 5/2011 | Hori | 701/112 |
| 8,131,453 | B2* | 3/2012 | Ulrey et al. | 701/112 |

(Continued)

FOREIGN PATENT DOCUMENTS

JP 2004-301047 A 10/2004
JP 2006-125276 A 5/2006

(Continued)

*Primary Examiner* — Thomas Black
*Assistant Examiner* — Robert Payne
(74) *Attorney, Agent, or Firm* — Sughrue Mion, PLLC

(57) ABSTRACT

It is provided a vehicle control device stopping an engine in operation when an automatic stop request is made and restarting the stopping engine when a restart request is made, wherein when the restart request is made while the engine is in transition to a rotation stop state in association with the automatic stop request, the engine is restarted if a crank position of the engine corresponds to a stroke other than a compression stroke while the engine is continuously stopped if the crank position of the engine corresponds to the compression stroke.

6 Claims, 6 Drawing Sheets

(56) References Cited

U.S. PATENT DOCUMENTS

| | | | |
|---|---|---|---|
| 8,175,791 B2* | 5/2012 | Lecole et al. | 701/112 |
| 8,423,271 B2* | 4/2013 | Gibson et al. | 701/112 |
| 8,494,758 B2* | 7/2013 | Ishikawa et al. | 701/112 |
| 2009/0037085 A1* | 2/2009 | Kojima | 701/113 |
| 2009/0248282 A1* | 10/2009 | Adachi | 701/112 |
| 2010/0114461 A1* | 5/2010 | Gibson | 701/112 |
| 2010/0204908 A1* | 8/2010 | Nakai | 701/112 |
| 2010/0250105 A1* | 9/2010 | Nagatsuyu et al. | 701/112 |
| 2010/0305790 A1* | 12/2010 | Yu et al. | 701/22 |
| 2011/0270512 A1* | 11/2011 | Hayashi et al. | 701/112 |
| 2012/0059571 A1* | 3/2012 | Yamada et al. | 701/112 |
| 2012/0109502 A1* | 5/2012 | Ishikawa et al. | 701/112 |
| 2012/0197509 A1* | 8/2012 | Watanabe | 701/102 |
| 2012/0271537 A1* | 10/2012 | Okabe et al. | 701/112 |
| 2013/0018569 A1* | 1/2013 | Sangameswaran et al. | 701/112 |
| 2013/0054060 A1* | 2/2013 | Dupuy | 701/22 |
| 2013/0066498 A1* | 3/2013 | Nissato | 701/22 |
| 2013/0066507 A1* | 3/2013 | Yamane et al. | 701/22 |
| 2013/0080036 A1* | 3/2013 | Yamauchi et al. | 701/112 |
| 2013/0096811 A1* | 4/2013 | Yamauchi et al. | 701/112 |
| 2013/0110382 A1* | 5/2013 | Ishikawa et al. | 701/112 |

FOREIGN PATENT DOCUMENTS

| | | |
|---|---|---|
| JP | 2006-283559 A | 10/2006 |
| JP | 2006-299997 A | 11/2006 |
| JP | 2007-023815 A | 2/2007 |
| JP | 2007-263046 A | 10/2007 |
| JP | 2008-215154 A | 9/2008 |
| JP | 2010-242563 A | 10/2010 |

* cited by examiner

VEHICLE CONTROL DEVICE

CROSS REFERENCE TO RELATED APPLICATIONS

This application is a National Stage of International Application No. PCT/JP2011/070771 filed Sep. 12, 2011, the contents of all of which are incorporated herein by reference in their entirety.

TECHNICAL FIELD

The present invention relates to a vehicle control device providing engine stop control when an automatic stop request is made while providing engine restart control when a restart request is made.

BACKGROUND ART

A vehicle is well-known that provides engine stop control of stopping an engine in operation when an automatic stop request is made in a state in which no engine power is required such as when the engine simply idles while the vehicle is stopped or when a hybrid vehicle is switched from engine running to motor running, for example. This corresponds to a vehicle described in Patent Document 1, for example. Patent Document 1 proposes that while an engine is in transition to a rotation stop state in association with provision of the engine stop control, if a restart request is made such as turning-on of an accelerator and turning-off of a brake, a restart control is initiated to restart the stopping engine even before the engine completely stops rotating.

PRIOR ART DOCUMENTS

Patent Documents

Patent Document 1: Japanese Laid-Open Patent Publication No. 2006-283559
Patent Document 2: Japanese Laid-Open Patent Publication No. 2010-242563
Patent Document 3: Japanese Laid-Open Patent Publication No. 2007-263046
Patent Document 4: Japanese Laid-Open Patent Publication No. 2004-301047
Patent Document 5: Japanese Laid-Open Patent Publication No. 2006-125276

SUMMARY OF THE INVENTION

Problem to be Solved by the Invention

A vehicle may have a resonance band amplifying vibrations transmitted from an engine to drive wheels in a range less than an idle rotation speed of the engine and a relatively lower rotation speed range near the idle rotation speed. If the engine is restarted because a restart request is made during stopping of the engine rotation while the engine rotation speed is passing such a resonance band, the lowered engine rotation speed is raised and may continuously stay in the resonance band for a prolonged time period. This promotes amplification of torque vibrations associated with the engine start and may increase a starting shock. On the other hand, if restart control is initiated after the engine completely stops rotating so as to suppress such a starting shock even when a restart request is made during stopping of the engine rotation while the engine rotation speed is passing the resonance band, the time until the engine start may be prolonged as compared to immediate restart during stopping of the rotation. As a result, an actual drive force is generated (increased) with a delay relative to acceleration performance associated with turning-on of an accelerator expected by a user, for example, and a feeling of strangeness may occur. The problem as described above is not known and no proposal has hitherto been made on satisfying both the starting shock suppression and the acceleration response at the time of a restart request during stopping of the engine rotation.

The present invention was conceived in view of the situations and it is therefore an object of the present invention to provide a vehicle control device capable of satisfying both the starting shock suppression and the acceleration response when a restart request is made while an engine is in transition to a rotation stop state in association with an automatic stop request.

Means for Solving the Problem

The object indicated above can be achieved according to a first aspect of the present invention, which provides (a) a vehicle control device stopping an engine in operation when an automatic stop request is made and restarting the stopping engine when a restart request is made, wherein (b) when the restart request is made while the engine is in transition to a rotation stop state in association with the automatic stop request, the engine is restarted if a crank position of the engine corresponds to a stroke other than a compression stroke while the engine is continuously stopped if the crank position of the engine corresponds to the compression stroke.

Advantages of the Invention

Consequently, when the crank position of the engine corresponds to a stroke other than the compression stroke, the engine is restarted with the rotational resistance of the engine reduced as compared to when the crank position corresponds to the compression stroke and, therefore, even if the engine is restarted while the engine is in transition to the rotation stop state, the time of staying in the resonance band is relatively shortened, for example, and the starting shock is suppressed. On the other hand, when the crank position of the engine corresponds to the compression stroke, the restart of the engine is delayed until the crank position of the engine shifts to a stroke other than the compression stroke; however, since only waiting for a period corresponding to the compression stroke is needed, the time until the engine start is shortened as compared to delaying the restart of the engine until the engine is put into the rotation stop state. Therefore, when the restart request is made while the engine is in transition to the rotation stop state in association with the automatic stop request, both the starting shock suppression and the acceleration response can be satisfied.

The second aspect of the invention provides the vehicle control device of the first aspect of the invention, including an electric motor suppressing vibrations generated at the restart of the engine, wherein when the restart request is made, if the electric motor can suppress the vibrations, the engine is restarted regardless of the crank position of the engine. Consequently, when the vibration suppression control can be provided through the electric motor, the restart of the engine can immediately be started since the starting shock is suppressed from the beginning.

The third aspect of the invention provides the vehicle control device of the first or second aspect of the invention, wherein the compression stroke is a preliminarily obtained stroke having a rotational resistance of the engine being a positive value and increasing toward the maximum value. Consequently, when the crank position of the engine corresponds to a stroke other than the compression stroke, the engine is restarted while the rotational resistance of the engine is certainly reduced as compared to when the crank position of the engine corresponds to the compression stroke.

The fourth aspect of the invention provides the vehicle control device of any one of the first to third aspects of the invention, wherein the vehicle is a hybrid vehicle including an electric differential portion having a differential mechanism distributing power from the engine to a differential electric motor and an output rotating member and a running electric motor coupled to a drive wheel in a power transmittable manner such that a differential state of the differential mechanism is controlled by controlling an operating state of the differential electric motor, and wherein the engine is started by rotationally driving the engine with the differential electric motor. Consequently, a reaction force at the start of the engine due to the differential electric motor acts on the output rotating member and, therefore, the starting shock tends to increase because of resonance, and the effect of suppressing the starting shock is easily obtained by restarting the engine when the crank position of the engine corresponds to a stroke other than the compression stroke partially.

The fifth aspect of the invention provides the vehicle control device of the fourth aspect of the invention, wherein the running electric motor suppresses vibrations generated at the restart of the engine due to the differential electric motor. Consequently, when the vibration suppression control can be provided through the running electric motor, the restart of the engine can immediately be started by the differential electric motor since the starting shock is suppressed from the beginning.

MODE FOR CARRYING OUT THE INVENTION

Figure 1:
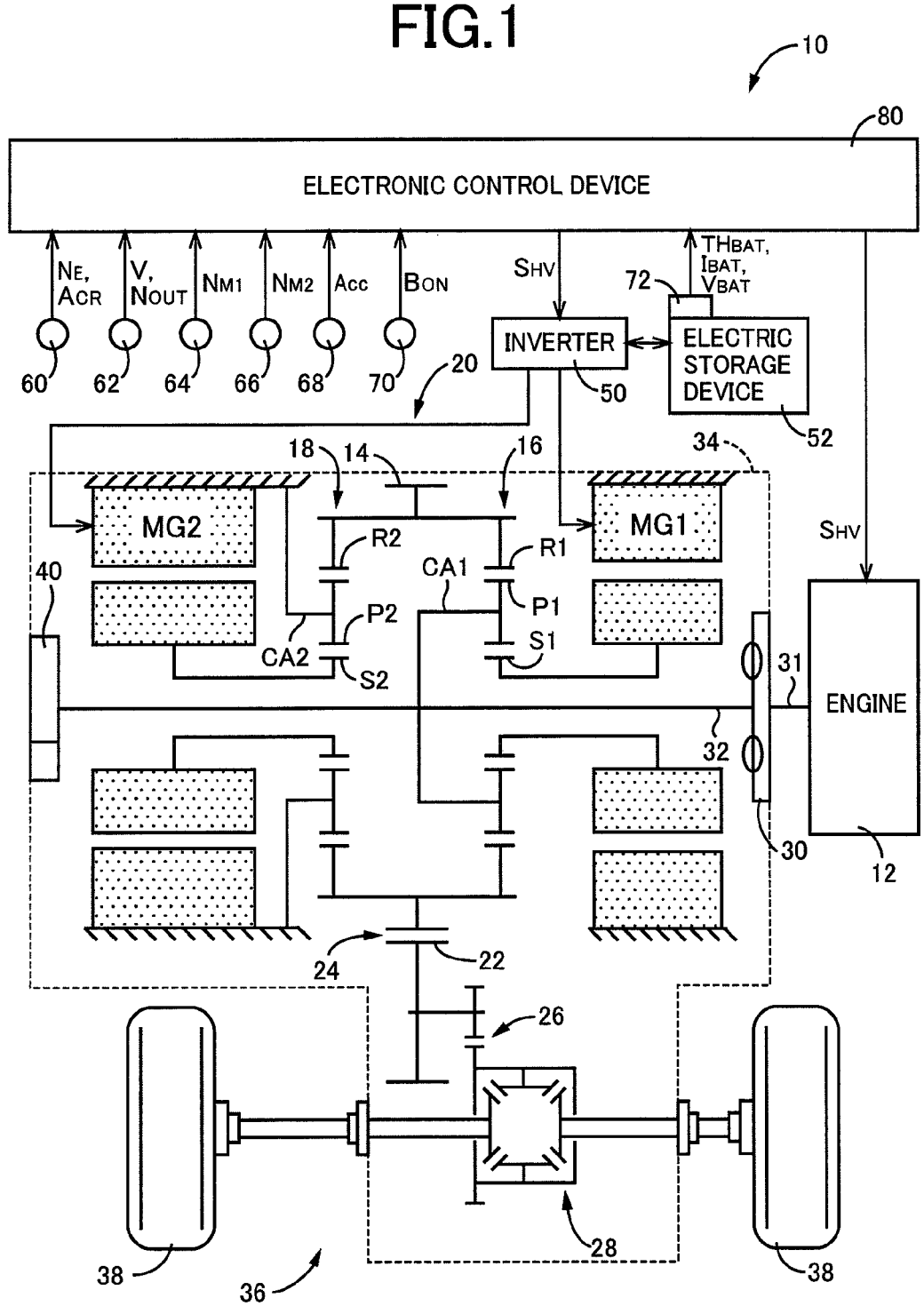
FIG. 1 is a diagram for explaining a general configuration of a hybrid vehicle to which the present invention is applied and a block diagram for explaining a main portion of a control system disposed in the vehicle.

In the present invention, preferably, the vehicle transmits, for example, the power of the engine via a power transmission device such as the automatic transmission to drive wheels. The automatic transmission is made up of, for example, a known planetary gear automatic transmission having a plurality of gear stages; a known synchromesh parallel two-shaft automatic transmission having a gear stage automatically switched by using a synchronizing device driven by a hydraulic actuator to selectively achieve a power transmission state of any one of a plurality of pairs of always engaging change gears disposed between two shafts; a so-called DCT (Dual Clutch Transmission) that is a synchromesh parallel two-shaft automatic transmission of a type having two systems of input shafts with clutches respectively linked to the input shafts of the systems and further respectively linked to even stages and odd stages; a so-called belt type continuously variable transmission having a transmission belt wound around a pair of variable pulleys to continuously vary a gear ratio without a step; a so-called fraction type continuously variable transmission having a pair of cones rotated around a common shaft center and a plurality of rollers rotatable around a rotation center intersecting with the shaft center so as to vary a gear ratio by sandwiching and pressing the rollers between the pair of the cones such that an intersection angle between the rotation center of the rollers and the shaft center is changed; or the electric differential portion.

Preferably, for example, an internal-combustion engine generating power through combustion of fuel such as a gasoline engine and a diesel engine is preferably used as the engine and an electric motor etc., can be employed in combination with the engine. Although a dedicated starter motor etc., may be included as a starting device starting this engine, an electric motor acting as a drive force source may be used.

Preferably, in a hybrid vehicle including the electric differential portion, the output rotating member and the drive wheels are coupled in a power transmittable manner and the running electric motor is coupled to the output rotating member of the differential mechanism directly or indirectly via a gear mechanism in a power transmittable manner. The gear mechanism is made up of, for example, a gear pair coupling two shafts in a power transmittable manner; single-stage reduction gears or speed-up gears made up of a differential gear device such as planetary gears and bevel gears; and various planetary gear multistage transmissions having, for example, two forward speeds, three forward speeds, or more shift stages with a plurality of sets of rotating elements of planetary gear devices selectively coupled by a friction engagement device to achieve a plurality of gear stages (shift stages) in an alternative manner.

Preferably, a hydraulic friction engagement device such as multi-plate and single-plate clutches and brakes engaged by a hydraulic actuator or belt type brakes are widely used for the friction engagement device in the planetary gear multistage transmissions. Although an oil pump supplying operating oil for engaging and actuating the hydraulic friction engagement device may be, for example, an oil pump driven by an engine that is a running drive force source to discharge the operating oil, the oil pump may be driven by a dedicated electric motor disposed separately from the engine.

Preferably, the differential mechanism is a device having three rotating elements, i.e., a first rotating element coupled to the engine, a second rotating element coupled to the differential electric motor, and a third rotating element coupled to the output rotating member.

Preferably, the differential mechanism is a single pinion type planetary gear device; the first rotating element is a carrier of the planetary gear device; the second rotating element is a sun gear of the planetary gear device; and the third rotating element is a ring gear of the planetary gear device.

Preferably, a mounting posture of the vehicle power transmission device relative to the vehicle may be of a transversely mounted type as in the case of FF (front-engine front-drive) vehicles having an axis of a drive device in the width direction of the vehicle or of a longitudinally mounted type as in the case of FR (front-engine rear-drive) vehicles having the axis of the drive device in the longitudinal direction of the vehicle.

Preferably, the engine and the differential mechanism may operatively be coupled to each other and, for example, a pulsation absorbing damper (vibration attenuating device), a direct clutch, a direct clutch with a damper, or a hydraulic transmission device may be interposed between the engine and the differential mechanism; however, the engine and the differential mechanism may always be coupled to each other.

An embodiment of the present invention will now be described in detail with reference to the drawings.

Embodiment

FIG. 1 is a diagram for explaining a general configuration of a hybrid vehicle 10 (hereinafter referred to as a vehicle 10) as a vehicle to which the present invention is applied and a block diagram for explaining a main portion of a control system disposed for controlling portions of the vehicle 10. In FIG. 1, the vehicle 10 includes a transmission portion 20 having a power distribution mechanism 16 distributing power output from an engine 12 acting as a running drive force source to a first electric motor MG1 and an output gear 14, a gear mechanism 18 coupled to the output gear 14, and a second electric motor MG2 coupled via the gear mechanism 18 to the output gear 14 in a power transmittable manner. The transmission portion 20 is preferably used in an FF (front-engine front-drive) vehicle in which the transmission portion 20 is transversely mounted on the vehicle 10, and a portion of a power transmission device 36 acting as a transaxle (T/A) in a case 34 acting as a non-rotating member attached to a vehicle body is made up of a counter gear pair 24 made up of the output gear 14 acting as an output rotating member of the transmission portion 20 (the power distribution mechanism 16) and a counter driven gear 22, a final gear pair 26, a differential gear device (final reduction gear) 28, a damper 30 operatively coupled to the engine 12, an input shaft 32 operatively coupled to the damper 30, etc. In the power transmission device 36 configured as described above, the power of the engine 12 input via the damper 30 and the input shaft 32 and the power of the second electric motor MG2 are transmitted to the output gear 14 and then transmitted from the output gear 14 sequentially through the counter gear pair 24, the final gear pair 26, the differential gear device 28, a pair of axles, etc., to a pair of drive wheels 38.

The input shaft 32 is coupled at one end via the damper 30 to the engine 12 and is rotationally driven by the engine 12. The other end is coupled to an oil pump 40 acting as a lubricant oil supplying device and the oil pump 40 is rotationally driven by the rotational drive of the input shaft 32, thereby supplying lubrication oil to the portions of the power transmission device 36, for example, the power distribution mechanism 16, the gear mechanism 18, and ball bearings not depicted.

The power distribution mechanism 16 is made up of a known single pinion type planetary gear device including, as rotating elements (rotating members), a first sun gear S1, a first pinion gear P1, a first carrier CA1 supporting the first pinion gear P1 in a rotatable and revolvable manner, and a first ring gear R1 engaging via the first pinion gear P1 with the first sun gear S1, and functions as a differential mechanism generating a differential action. In this power distribution mechanism 16, the first carrier CA1 is coupled as a first rotating element RE1 to the input shaft 32, i.e., the engine 12; the first sun gear S1 is coupled as a second rotating element RE2 to the first electric motor MG1; and the first ring gear R1 is coupled as a third rotating element RE3 to the output gear 14. As a result, the first sun gear S1, the first carrier CA1, and the first ring gear R1 are rotatable relative to each other; therefore, the output of the engine 12 is distributed to the first electric motor MG1 and the output gear 14; the first electric motor MG1 generates electricity from the output power of the engine 12 distributed to the first electric motor MG2; the generated electric energy is accumulated via an inverter 50 into an electric storage device 52; the electric energy also rotationally drives the second electric motor M2; and, therefore, the transmission portion 20 is put into, for example, a stepless shifting state (electric CVT state) to function as an electric stepless transmission with a gear ratio $\gamma 0$ (=engine rotation speed $N_E$/rotation speed $N_{OUT}$ of the output gear 14) continuously varied. In other words, the transmission portion 20 acts as an electric differential portion (electric stepless transmission) with the differential state of the power distribution mechanism 16 controlled by controlling the operating state of the first electric motor MG1 acting as a differential electric motor. This enables the transmission portion 20 to operate the engine 12 at an optimum fuel economy point, which is an operational point of the engine 12 (e.g., an operational point indicative of an operating state of the engine 12 defined by the engine rotation speed $N_E$ and an engine torque $T_E$; hereinafter referred to as an engine operating point) achieving the best fuel economy, for example. This type of hybrid forms is referred to as a mechanical distribution type or a split type.

The gear mechanism 18 is made up of a known single pinion type planetary gear device including, as rotating elements, a second sun gear S2, a second pinion gear P2, a second carrier CA2 supporting the second pinion gear P2 in a rotatable and revolvable manner, and a second ring gear R2 engaging via the second pinion gear P2 with the second sun gear S2. In the gear mechanism 18, the second carrier CA2 is coupled to, and prevented from rotating by, a case 34 that is a non-rotating member; the second sun gear S2 is coupled to the second electric motor MG2; and the second ring gear R2 is coupled to the output gear 14. The gear mechanism 18 is composed such that the planetary gear device itself has a gear ratio (gear ratio=the number of teeth of the second sun gear S2/the number of teeth of the second ring gear R2) so that the gear mechanism 18 may function as reduction gears, for example, and, during power running while the second electric motor MG2 outputs a torque (drive force), the rotation of the second electric motor MG2 is reduced and transmitted to the output gear 14 and the torque thereof is increased and transmitted to the output gear 14. This output gear 14 is a compound gear integrating into one gear the functions as the ring gear R1 of the power distribution mechanism 16 and the ring gear R2 of the gear mechanism 18 and the function of a counter drive gear engaged with the counter driven gear 22 to make up the counter gear pair 24.

The first electric motor MG1 and the second electric motor MG2 are, for example, synchronous electric motors including at least one of a function as a motor generating a mechanical drive force from electric energy and a function as an electric generator generating electric energy from a mechanical drive force and preferably are motor generators selectively operated as motors or electric generators. For example, the first electric motor MG1 has a generator (electric generation) function for accepting a reaction force of the engine 12 and a motor (electric motor) function of rotationally driving the engine 12 during suspension of operation, and the second electric motor MG2 has an electric motor function for acting as a running electric motor that outputs a drive force as a running drive force source and an electric generation function of generating electric energy through regeneration from a reverse drive force from the drive wheels 38.

The vehicle 10 includes an electronic control device 80 as a control device of the vehicle 10 controlling the portions of the vehicle 10 such as the transmission portion 20, for example. This electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls concerning the vehicle 10. For example, the electronic control device 80 provides vehicle control such as hybrid drive control related to the engine 12, the first electric motor MG1, the second electric motor MG2, etc., and is configured in a divided manner as needed for the output control of the engine 12 and the output control of the electric motors MG1, MG2. The electronic control device 80 is supplied with various input signals (e.g., the engine rotation speed $N_E$, a crank angle (i.e., crank position) $A_{CR}$ that is a rotation angle (position) of a crankshaft 31, the output rotation speed $N_{OUT}$ that is a rotation speed of the output gear 14 corresponding to the vehicle speed V, a first electric motor rotation speed $N_{M1}$, a second electric motor rotation speed $N_{M2}$, an accelerator opening degree $A_{CC}$, a foot brake operation (brake-on) $B_{ON}$, and a battery temperature $TH_{BAT}$, a battery charging/discharging current $I_{BAT}$, and a battery voltage $V_{BAT}$ of the electric storage device 52) detected by sensors disposed on the vehicle 10 (e.g., a crank position sensor 60, an output rotation speed sensor 62, a first electric motor rotation speed sensor 64 such as a resolver, a second electric motor rotation speed sensor 66 such as a resolver, an accelerator opening degree sensor 68, a brake switch 70, and a battery sensor 72). The electronic control device 80 supplies various output signals (e.g., a hybrid control command signal $S_{HV}$ such as an engine control command signal and an electric motor control command signal (shift control command signal)) to the devices (e.g., the engine 12 and the invertor 50) disposed on the vehicle 10. The electronic control device 80 successively calculates a state of charge (charging capacity) SOC of the electric storage device 52 based on the battery temperature $TH_{BAT}$, the battery charging/discharging current $I_{BAT}$, and the battery voltage $V_{BAT}$, for example.

Figure 2:
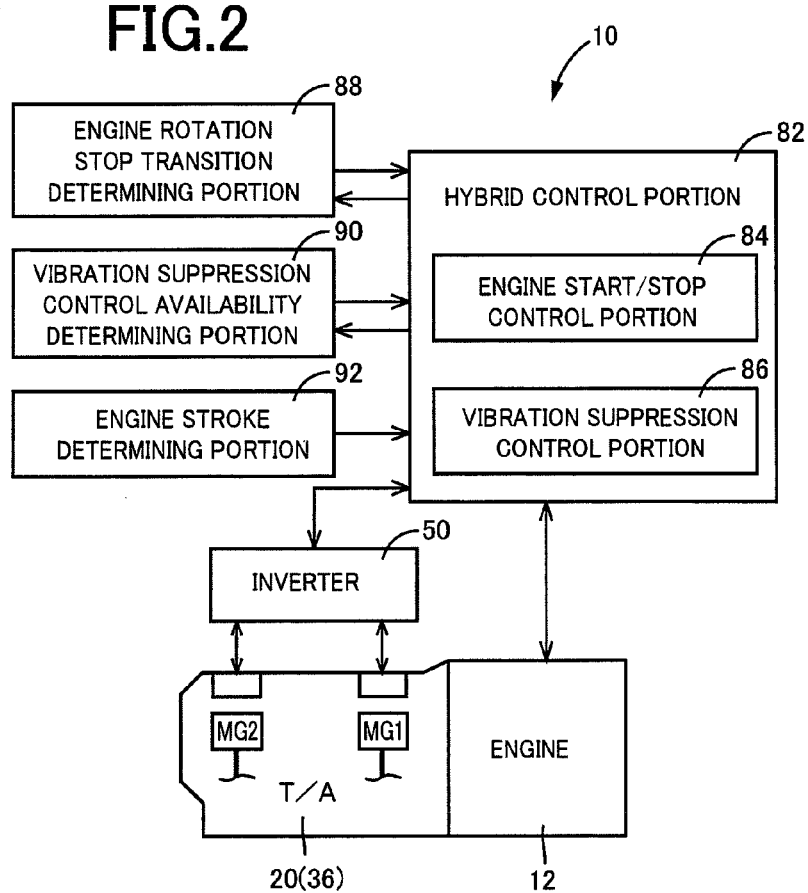
FIG. 2 is a functional block diagram for explaining a main portion of the control function of the electronic control device.

FIG. 2 is a functional block diagram for explaining a main portion of the control function of the electronic control device 80. In FIG. 2, a hybrid control means, i.e., a hybrid control portion 82 selectively establishes in accordance with a running state, for example, a motor running mode for performing motor running (EV running) in which only the second electric motor MG2 is used as the running drive source; an engine running mode (normal running mode) for performing engine running in which at least the engine 12 is used as the running drive source by transmitting an engine direct transmission torque to the output gear 14 (the drive wheels 38) with the electric generation of the first electric motor MG1 accepting the reaction force to the power of the engine 12 while driving the second electric motor MG2 with electric power generated by the first electric motor MG1 to transmit a torque to the output gear 14; and an assist running mode (acceleration running mode) in which the drive force of the second electric motor MG2 using the electric power from the electric storage device 52 is also added during running in the engine running mode.

Specifically describing an example of control in the engine running mode, the hybrid control portion 82 operates the engine 12 in an efficient operation range while optimally changing the distribution of the drive force between the engine 12 and the second electric motor MG2 and the reaction force due to the electric generation of the first electric motor MG1 so as to control the gear ratio γ0 of the transmission portion 20. For example, the hybrid control portion 82 calculates a target output (request output) of the vehicle 10 from the accelerator opening degree Acc and the vehicle speed V, calculates a necessary total target output from the target output and a charge request value (charge request power), and calculates a target engine power $P_E^*$ such that the total target output is acquired in consideration of a transmission loss, an accessory load, an assist torque of the second electric motor MG2, etc. The hybrid control portion 82 controls the engine 12 and controls the quantity of electricity generated by the first electric motor MG1 such that the engine 12 is operated on a known engine optimum fuel economy line empirically obtained and stored in advance for satisfying both the drivability and the fuel economy property as well as at the engine rotation speed $N_E$ and the engine torque $T_E$ achieving an engine operation point at which the target engine power $P_E^*$ can be acquired. In this embodiment, fuel economy refers to, for example, a running distance per unit fuel consumption, or a fuel consumption rate (=fuel consumption/drive wheel output) of a vehicle as a whole.

The hybrid control portion 82 outputs engine control command signals to control opening/closing of an electronic throttle valve with a throttle actuator for throttle control, to control a fuel injection amount and an injection timing of a fuel injection device for fuel injection control, and to control the timing of ignition by an ignition device for ignition timing control and provides the output control of the engine 12 in such a manner as to acquire the target value of the engine torque $T_E$ for generating the target engine power $P_E^*$. The hybrid control portion 82 outputs electric motor control command signals to the inverter 50 to control the electric generation of the first electric motor MG1 and controls the first electric motor rotation speed $N_{M1}$ in such a manner as to acquire the target value of the engine rotation speed $N_E$ for generating the target engine power $P_E^*$.

The motor running mode is performed in, for example, a relatively lower output torque $T_{OUT}$ range, i.e., a lower engine torque $T_E$ range generally considered as having poor engine efficiency as compared to a higher torque range, or in a relatively lower vehicle speed range of the vehicle speed V, i.e., a lower load range. During the motor running in the motor running mode, the hybrid control portion 82 achieves a no-load state to idle the first electric motor MG1, for example, and maintains the engine rotation speed $N_E$ at zero or substantially zero through the differential action of the power distribution mechanism 16 so as to suppress the drag of the engine 12 that is not operating and to improve the fuel economy. As described above, the hybrid control portion 82 stops not only the fuel supply to the engine 12 but also the rotation (rotational drive) of the engine 12 when the operation of the engine 12 is stopped as in the case of the motor running.

The hybrid control portion 82 functionally includes an engine start/stop control means, i.e., an engine start/stop control portion 84 starting and stopping the engine 12. For example, when it is determined to stop the operation of the engine 12 due to an engine automatic stop request such as a request for switching to the motor running mode associated with reduction in the accelerator opening degree Acc during the engine running, a determination on completion of charging the electric storage device 52, a determination on stoppage of vehicle accessories, a determination on completion of warming-up, a determination on stoppage of a vehicle, and a determination on turning-on of an EV switch operated for actively requesting the motor running, the engine start/stop control portion 84 executes a series of engine rotation stop processes of stopping the operation of engine 12 with fuel cut and turning a first electric motor torque $T_{M1}$ to zero so as to reduce the engine rotation speed $N_E$ toward zero, thereby putting the engine 12 into a rotation stop state.

On the other hand, for example, when it is determined to operate the stopping engine 12 due to an engine start request (or an engine restart request) such as a request for switching to the engine running mode associated with increase in the accelerator opening degree Acc during the motor running, a request for charging the electric storage device 52, a request for driving vehicle accessories, and a request for warming-up, the engine start/stop control portion 84 executes a series of engine start processes of raising the first electric motor rotation speed $N_{M1}$ by applying current to the first electric motor MG1 to generate a predetermined engine starting torque, i.e., a cranking torque $T_{M1}cr$, for rotationally driving the engine rotation speed $N_E$ equal to or greater than a predetermined complete explosion rotation speed $N_E A$ enabling the complete explosion of the engine 12 and of supplying and igniting fuel at the predetermined complete explosion rotation speed $N_E A$ or higher to start the engine 12. In this way, the first electric motor MG1 is allowed to function as a starting motor (starter) for rotationally driving the engine 12 at the start of the engine.

Since the reaction force to the cranking torque $T_{M1}cr$ acts on the output gear 14 due to the structure of the transmission portion 20 at the start of the engine, engine vibrations (engine torque fluctuations, friction torque fluctuations) due to the cranking torque $T_{M1}cr$ are transmitted to the output gear 14 at the start of the engine. On the other hand, the vehicle 10 of this embodiment has a resonance band, in which the frequency of the engine vibrations matches the resonance frequency of the power transmission device 36, in a lower rotation speed range less than an idle rotation speed of the engine 12 and a relatively lower rotation speed range near the complete explosion rotation speed $N_E A$. Therefore, the engine vibrations generated at the start of the engine may be amplified in the resonance band, increasing a vibrating shock at the start of the engine.

The engine restart request may be made while the engine 12 is in transition to the rotation stop state because the engine start/stop control portion 84 executes the engine rotation stop processes in association with the engine automatic stop request. In such a case, if the engine start/stop control portion 84 immediately starts the engine start processes, the lowered engine rotation speed $N_E$ is raised by the first electric motor MG1. Therefore, the time of staying in the resonance band is prolonged as compared to the case of raising the engine 12 in the rotation stop state, and the engine vibrations are more amplified, which may further increase the shock at the start of the engine. On the other hand, if the engine start/stop control portion 84 starts the engine start processes after the engine 12 is put into the rotation stop state, the restart of the engine 12 is delayed and, for example, an acceleration response is deteriorated relative to an acceleration feel expected by a user (driver) in association with turning-on of an accelerator, which may cause a feeling of strangeness.

For such a problem, the electronic control device 80 of this embodiment uses an electric motor MG to provide vibration suppression control that suppresses the vibrations at the start of the engine. Specifically, the hybrid control portion 82 functionally includes a vibration suppression control means, i.e., a vibration suppression control portion 86 using the second electric motor MG2 to suppress the vibrations generated by the first electric motor MG1 at the start of the engine. For example, the vibration suppression control portion 86 detects a difference $\Delta N$ ($=N_{OUT}-N_E$) between the engine rotation speed $N_E$ and the output rotation speed $N_{OUT}$ and suppresses torsional vibrations corresponding to a difference between the difference $\Delta N$ and the normal difference $\Delta N$ through feedback control by using a second electric motor torque $T_{M2}$ so as to provide the vibration suppression control through the electric motor MG. Alternately, for example, the vibration suppression control portion 86 provides feedback control generating fluctuations in a phase opposite to the fluctuations of the output rotation speed $N_{OUT}$ (or the rotation speed of the drive wheels 38) by using the second electric motor MG2 such that the vibrations generated at the start of the engine are cancelled so as to provide the vibration suppression control through the electric motor MG. As described above, the second electric motor MG2 acts as an electric motor suppressing the vibrations generated at the restart of the engine 12. Although the vibration suppression control through the electric motor MG produces a certain effect of suppressing the shock even if provided at the start of the engine when the engine 12 is in the rotation stop state, the effect of suppressing the shock is increased particularly when the vibration suppression control is provided at the start of the engine while the engine 12 is in transition to the rotation stop state.

However, the vibration suppression control through the electric motor MG is executed only when the electric motor MG can quickly be controlled because rapid responsiveness is required. For example, in this embodiment, when the second electric motor MG2 is within a relatively lower rotation speed range, i.e., the vehicle speed V is within a relatively lower vehicle speed range, the drive control is provide through pulse width modulation (PWM) capable of relatively quick control. On the other hand, when the second electric motor MG2 is within a relatively higher rotation speed range, i.e., the vehicle speed V is within a relatively higher vehicle speed range, the drive control is provided in accordance with square wave (rectangular wave), resulting in relatively slow control with the number of times of switching reduced as compared to the PWM. Therefore, although the vibration suppression control through the second electric motor MG2 can be provided if the second electric motor MG2 is within a relatively lower rotation speed range, the vibration suppression control through the second electric motor MG2 cannot be provided if the second electric motor MG2 is within a relatively higher rotation speed range. The first electric motor MG1 may be controlled in the same way.

Therefore, when the engine restart request is made while the engine 12 is in transition to the rotation stop state (i.e., within a rotation transition section) because the engine start/stop control portion 84 executes the engine rotation stop processes in association with the engine automatic stop request, if the vibration suppression control through the electric motor MG (particularly, the second electric motor MG2) cannot be provided, the electronic control device 80 of the present embodiment restarts the engine 12 provided that a rotational resistance (friction torque) of the engine 12 as a whole is in a relatively small state. From another point of view, if the friction torque of the engine 12 as a whole is in a relatively large state, the engine 12 is not restarted and the operation of the engine 12 is continuously suspended until the friction torque enters the relatively small state. As a result, since the time of staying in the resonance band is shortened and partially because the cranking torque $T_{M1}cr$ can be reduced, the shock at the start of the engine can be suppressed even if the vibration suppression control through the electric motor MG cannot be provided.

Figure 3:
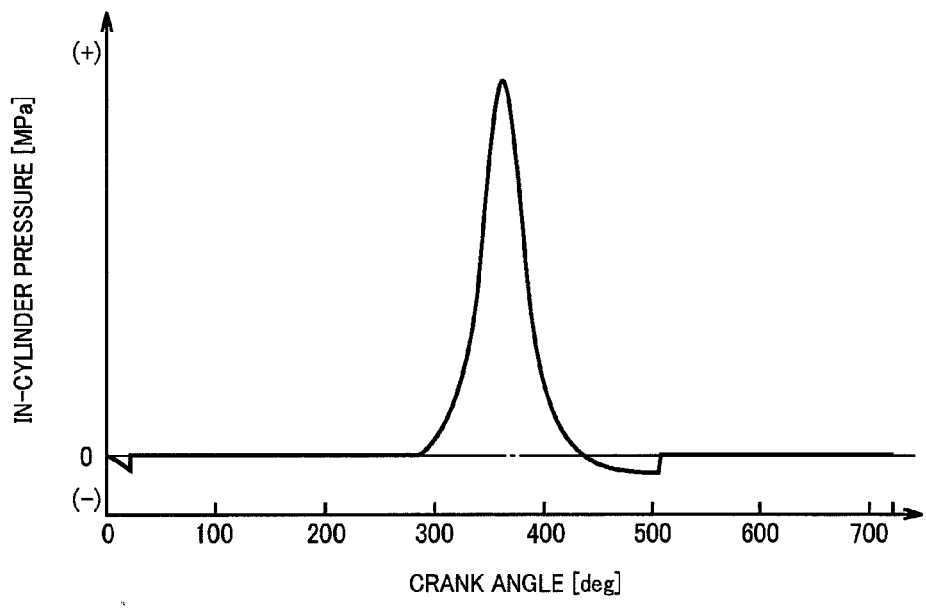
FIG. 3 is a diagram of an example of an in-cylinder pressure relative to a crank angle in one cylinder of the engine.
Figure 4:
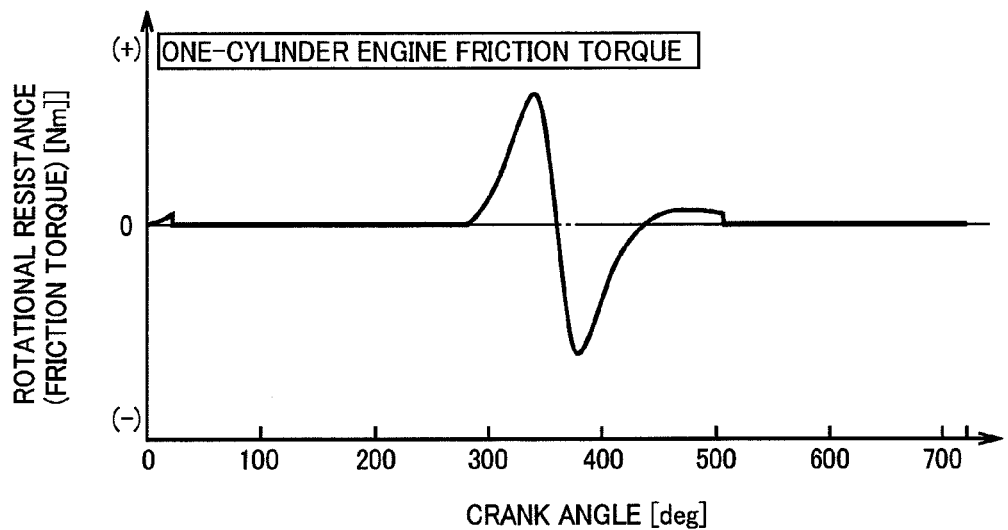
FIG. 4 is a diagram of an example of a friction torque of the engine relative to the crank angle in one cylinder of the engine.
Figure 5:
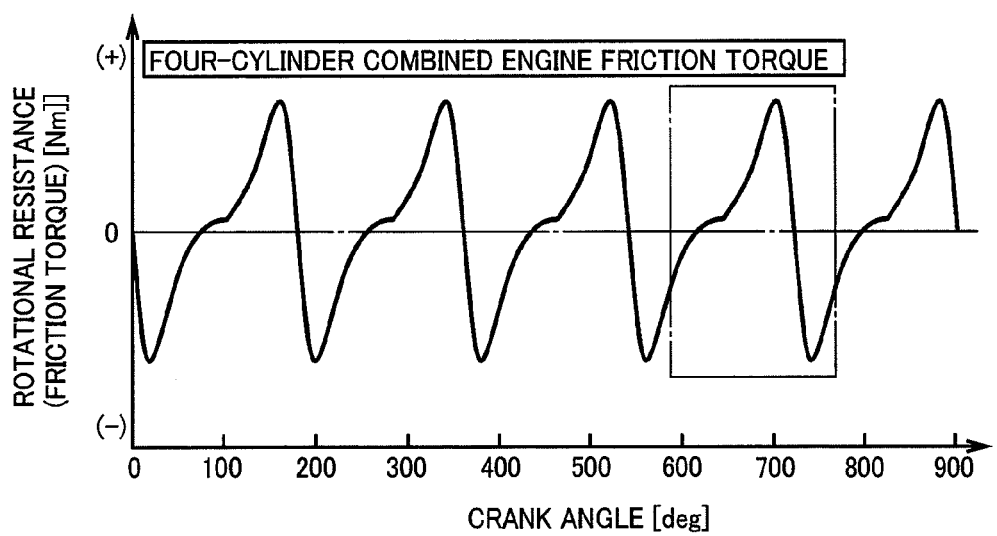
FIG. 5 is a diagram of an example of a combined friction torque of the engine relative to the crank angle.
Figure 6:
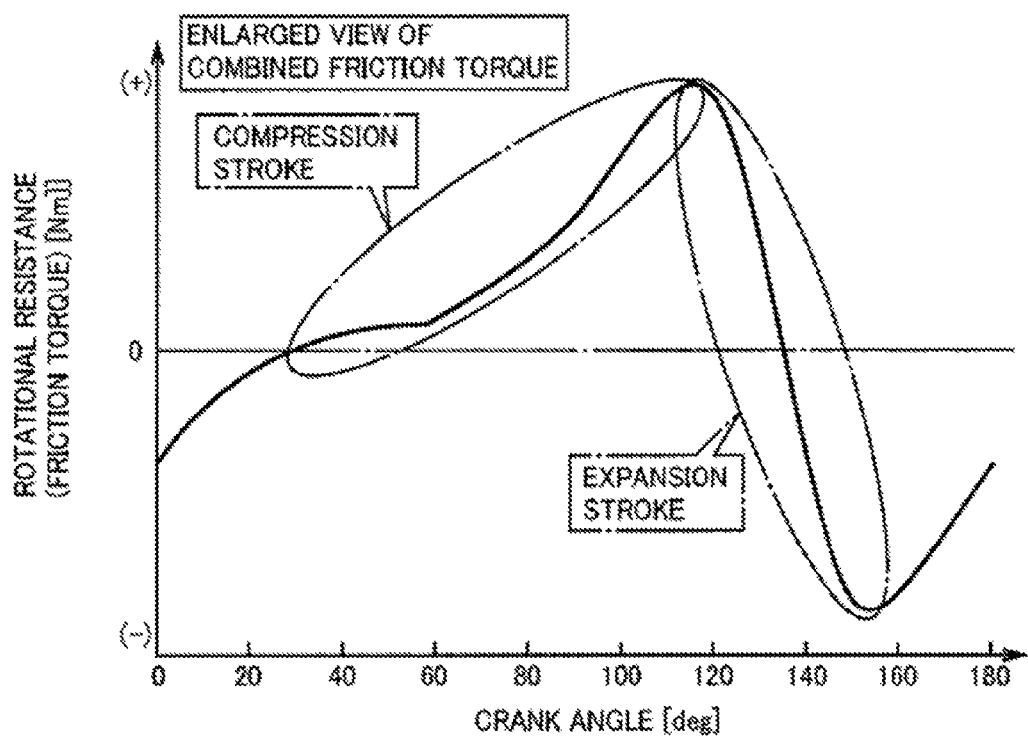
FIG. 6 is an enlarged view of a portion in the combined friction torque of the engine depicted in FIG. 5.

The relatively small state of the friction torque and the relatively large state of the friction torque of the engine 12 as a whole will hereinafter be described in detail. FIG. 3 is a diagram of an in-cylinder pressure relative to a crank angle $A_{CR}$ in one cylinder of the engine 12. FIG. 4 is a diagram of a friction torque of the engine 12 relative to the crank angle $A_{CR}$ in one cylinder of the engine 12. FIG. 5 is a diagram of a combined friction torque of the engine 12 acquired by combining the friction torques of the engine 12 as a whole, i.e., the friction torques of all the cylinders, relative to the crank angle $A_{CR}$. FIG. 6 is an enlarged view of a portion surrounded by a dashed-dotted line in the combined friction torque of the engine 12 depicted in FIG. 5. This description will be made on the assumption that the engine 12 is a four-cylinder four-stroke cycle engine.

In FIG. 3, a section with increasing in-cylinder pressure corresponds to a compression stroke of the engine 12 and a section with decreasing in-cylinder pressure corresponds to an expansion stroke of the engine 12. As depicted in FIG. 4, the friction torque of the engine 12 is changed in accordance with the change in the in-cylinder pressure. Specifically, the section with the friction torque increasing from substantially zero to the maximum value corresponds to the compression stroke of the engine 12, and the section with the friction torque decreasing from the maximum value and the section with negative values correspond to the expansion stroke of the engine 12. The combined friction torque of the engine 12 depicted in FIGS. 5 and 6 is acquired by combining one-cylinder friction torques depicted in FIG. 4 for four cylinders. As depicted in FIG. 6, in this embodiment, the combined friction torque of the engine 12 has a stroke with the friction torque of the engine 12 turning to a positive value and increasing toward the maximum value, which is defined as a compression stroke of the engine 12 as a whole, and a range of the crank angle $A_{CR}$ corresponding to this compression stroke (compression-stroke crank angle range $A_{CR}A$) is obtained and stored in advance. Alternatively, a range of the crank angle $A_{CR}$ corresponding to strokes other than the compression stroke (non-compression-stroke crank angle range $A_{CR}B$) is obtained and stored in advance.

The compression stroke of the engine 12 as a whole corresponds to the relatively large state of the friction torque of the engine 12 as a whole since the friction torque of the engine 12 is a positive value and increasing. Therefore, the strokes other than the compression stroke correspond to the relatively small state of the friction torque of the engine 12 as a whole. Comparing only the values of the friction torque, a stroke other than the compression stroke (e.g., a stroke with the friction torque of the engine 12 decreasing from the maximum value, i.e., an expansion stroke of the engine 12 as a whole) has a section with a value greater than a relatively smaller value of the compression stroke; however, the strokes other than the compression stroke are defined as the relatively small state of the friction torque from the viewpoint that a piston moves without application of an external force in the decreasing section even if the friction torque is positive value.

As described above, when the engine restart request is made while the engine 12 is in transition to the rotation stop state because the engine start/stop control portion 84 executes the engine rotation stop processes in association with the engine automatic stop request, the electronic control device 80 of the present embodiment restarts the engine 12 if the crank angle $A_{CR}$ corresponds to a stroke other than the compression stroke of the engine 12 as a whole while the electronic control device 80 continuously stops the operation of the engine 12 if the crank angle $A_{CR}$ corresponds to the compression stroke of the engine 12 as a whole. When the vibration suppression control through the electric motor MG can be provided, the shock at the start of the engine can be suspended without providing such control and, therefore, the engine 12 is restarted regardless of the crank angle $A_{CR}$.

Figure 7:
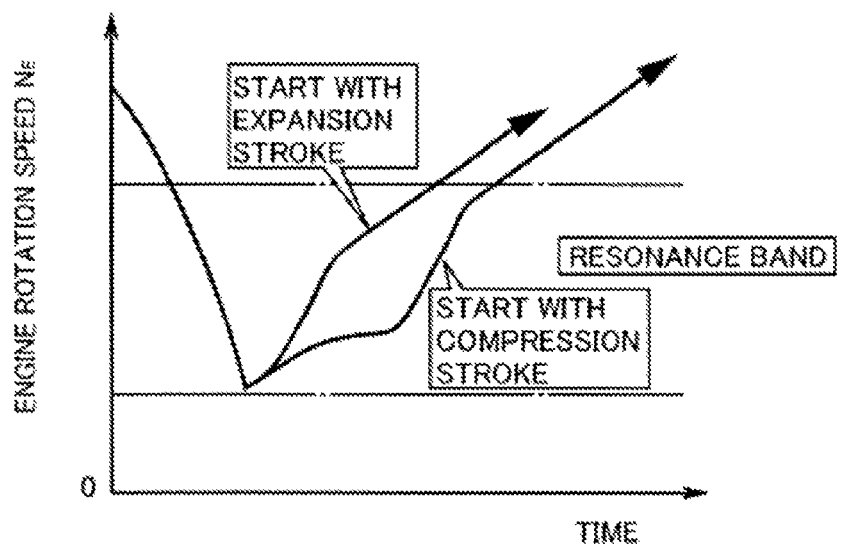
FIG. 7 is a diagram for comparing the time of staying in the resonance band in the case of restarting the engine in the compression stroke and that in the case of restarting the engine in the expansion stroke.
Figure 8:
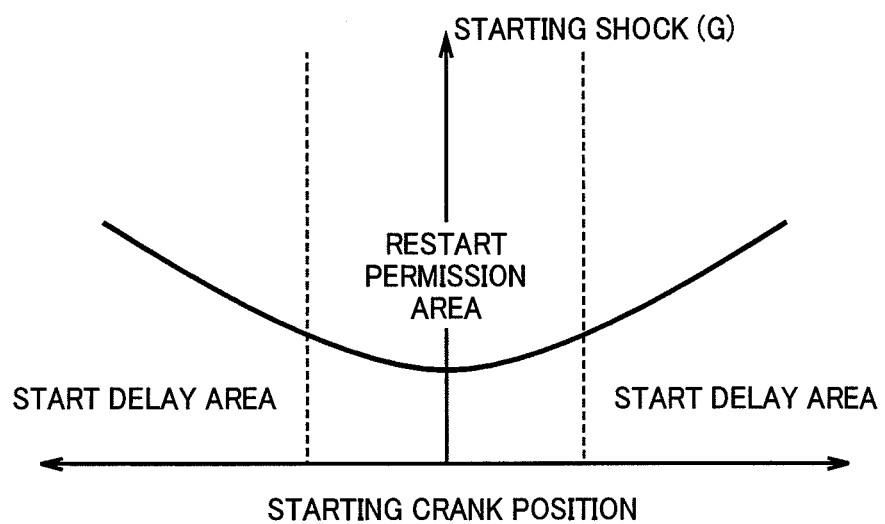
FIG. 8 is a diagram for comparing the shock at the start of the engine in the case of restarting the engine in the compression stroke and that in the case of restarting the engine other than in the compression stroke.

As a result, as described in FIG. 7, the time of staying in the resonance band is shortened in the case of restarting the engine 12 in a stroke (e.g., the expansion stroke) other than the compression stroke, as compared to the case of restarting the engine 12 in the compression stroke. Therefore, as described in FIG. 8, if the engine 12 is restarted in a stroke defined as a restart permission area other than the compression stroke, partially because the cranking torque $T_{M1}cr$ can be reduced, the shock at the start of the engine can be suppressed as compared to the restart of the engine 12 in the compression stroke defined as a start delay area.

More specifically, returning to FIG. 2, an engine rotation stop transition determining means, i.e., an engine rotation stop transition determining portion 88 determines whether the engine 12 is in transition to the rotation stop state in association with the engine automatic stop request, based on a change in the engine rotation speed $N_E$ when the engine start/stop control portion 84 executes the engine rotation stop processes, for example.

If the engine start/stop control portion 84 determines that an engine start request (or an engine restart request) is made, a vibration suppression control availability determining means, i.e., a vibration suppression control availability determining portion 90 determines whether the vibration suppression control portion 86 can provide the vibration suppression control through the second electric motor MG2, based on whether the second electric motor rotation speed $N_{M2}$ is within a predetermined PWM executable speed range obtained and stored in advance for executing the drive control through PWM, for example.

An engine stroke determining means, i.e., an engine stroke determining portion 92 determines whether the crank angle $A_{CR}$ is within the non-compression-stroke crank angle range $A_{CR}B$. More preferably, the engine stroke determining portion 92 may determine whether the crank angle $A_{CR}$ is within an expansion stroke crank angle range $A_{CR}C$ obtained and stored in advance as a range of the crank angle $A_{CR}$ corresponding to the expansion stroke of the engine 12 as a whole, which is defined as a particularly small state of the friction torque among the strokes other than the compression stroke.

Figure 9:
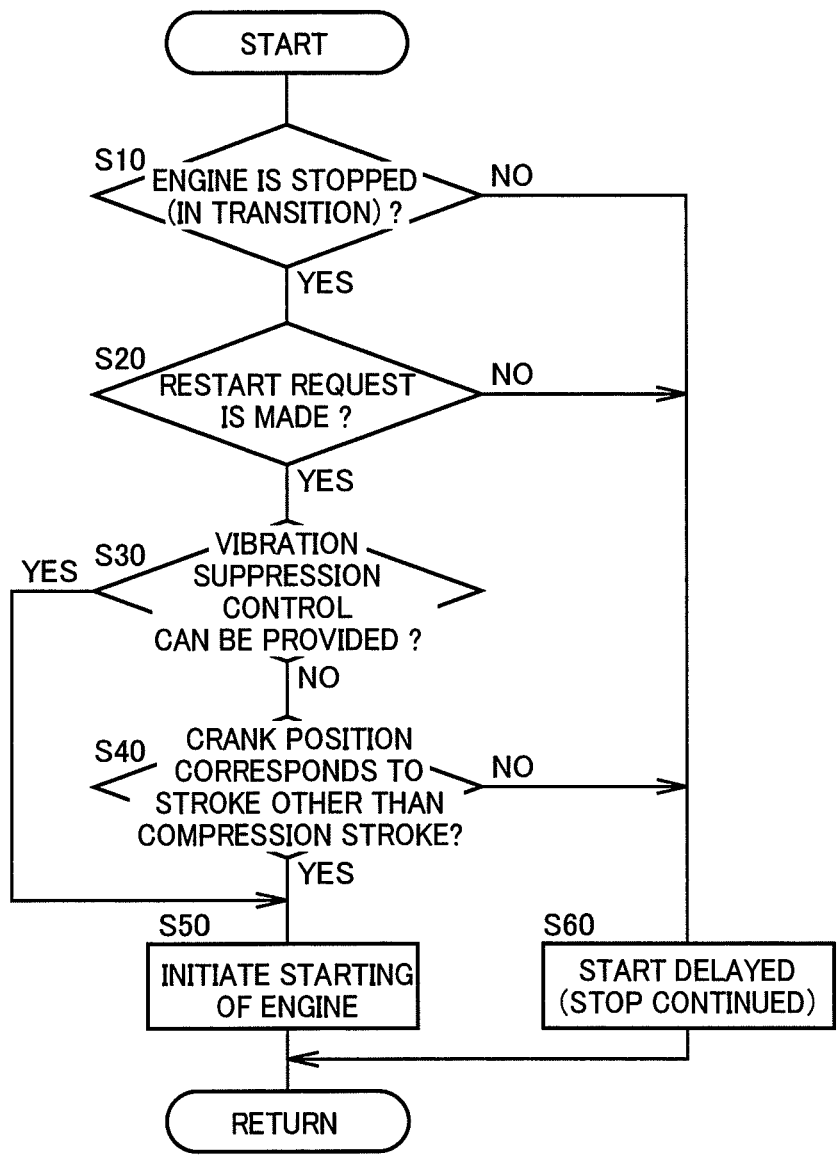
FIG. 9 is a flowchart for explaining a main portion of the control operation of the electronic control device, i.e., a control operation for satisfying both the starting shock suppression and the acceleration response when a restart request is made while the engine is in transition to the rotation stop state in association with an automatic stop request.

FIG. 9 is a flowchart for explaining a main portion of the control operation of the electronic control device 80, i.e., a control operation for satisfying both the starting shock suppression and the acceleration response when a restart request is made while the engine 12 is in transition to the rotation stop state in association with an automatic stop request, and the flowchart is repeatedly executed with an extremely short cycle time, for example, on the order of few msec to a few tens of msec.

In FIG. 9, first, at step (hereinafter, "step" will be omitted) S10 corresponding to the engine rotation stop transition determining portion 88, it is determined whether the engine 12 is in transition to the rotation stop state in association with the engine automatic stop request, based on a change in the engine rotation speed $N_E$ when the engine rotation stop processes are executed, for example. If the determination at S10 is positive, at S20 corresponding to the engine start/stop control portion 84, it is determined whether an engine restart request is made such as a request for switching to the engine running mode, a request for charging the electric storage device 52, a request for driving vehicle accessories, and a request for warming-up, for example. If the determination at S20 is positive, at S30 corresponding to the vibration suppression control availability determining portion 90, it is determined whether the vibration suppression control through the second electric motor MG2 can be provided, based on whether the second electric motor rotation speed $N_{M2}$ is within the predetermined PWM executable speed range, for example. If the determination at S30 is negative, at S40 corresponding to the engine stroke determining portion 92, it is determined whether the crank angle $A_{CR}$ corresponds to a stroke other than the compression stroke, based on whether the crank angle $A_{CR}$ is within the non-compression-stroke crank angle range $A_{CR}B$ corresponding to the stokes other than the compression stroke, for example. Particularly, it may be determined whether the crank angle $A_{CR}$ is within the expansion stroke crank angle range $A_{CR}C$ corresponding to the expansion stroke. If one of the determinations at S30 and S40 is positive, at S50 corresponding to the engine start/stop control portion 84, a series of the engine start processes is started to generate the cranking torque $T_{M1}cr$ with the first electric motor MG1 and supply and ignite fuel so as to start the engine 12, for example. If one of the determinations at S10, S20, and S40 is negative, at S60 corresponding to the engine start/stop control portion 84, the start of the engine start processes is delayed and the rotation stop state of the engine 12 is continued, for example.

As described above, according to this embodiment, when the restart request is made while the engine 12 is in transition to a rotation stop state in association with the automatic stop request, the engine 12 is restarted if the crank angle $A_{CR}$ corresponds to a stroke other than the compression stroke while the engine 12 is continuously stopped if the crank angle $A_{CR}$ corresponds to the compression stroke. As a result, when the crank angle $A_{CR}$ corresponds to a stroke other than the compression stroke, the engine 12 is restarted with the friction torque of the engine 12 as a whole reduced as compared to when the crank angle $A_{CR}$ corresponds to the compression stroke and, therefore, even if the engine 12 is restarted while the engine 12 is in transition to the rotation stop state, the time of staying in the resonance band is relatively shortened, for example, and the starting shock is suppressed. Particularly, although the vehicle 10 of this embodiment employs a configuration causing a reaction force at the start of the engine due to the first electric motor MG1 to act on the output gear 14 and the starting shock (shock at the start of the engine) therefore tends to increase because of resonance, the effect of suppressing the starting shock is easily obtained by restarting the engine 12 when the crank angle $A_{CR}$ corresponds to a stroke other than the compression stroke partially because the cranking torque $T_{M1}cr$ can be reduced. On the other hand, when the crank angle $A_{CR}$ corresponds to the compression stroke, the restart of the engine 12 is delayed until the crank angle $A_{CR}$ shifts to a stroke other than the compression stroke; however, since only waiting for a period corresponding to the compression stroke is needed, the time until the engine start is shortened as compared to delaying the restart of the engine 12 until the engine 12 is put into the rotation stop state. Therefore, when the restart request is made while the engine 12 is in transition to the rotation stop state in association with the automatic stop request, both the starting shock suppression and the acceleration response can be satisfied.

According to this embodiment, when the restart request is made, if the vibration suppression control can be provided through the second electric motor MG2, the engine 12 is restarted regardless of the crank angle $A_{CR}$ and, therefore, the restart of the engine 12 can immediately be started by the first electric motor MG1 while the starting shock is suppressed by the vibration suppression control through the second electric motor MG2 from the beginning.

According to this embodiment, since the compression stroke of the engine 12 as a whole is a preliminarily obtained stroke with the friction torque of the engine 12 turning to a positive value and increasing toward the maximum value, when the crank angle $A_{CR}$ corresponds to a stroke other than the compression stroke, the engine 12 is restarted while the friction torque of the engine 12 is certainly reduced as compared to when the crank angle $A_{CR}$ corresponds to the compression stroke.

Although the embodiment of the present invention has been described in detail with reference to the drawings, the present invention is applicable in other forms.

For example, although the vehicle 10 of the embodiment is a hybrid vehicle employing the configuration causing a reaction force at the start of the engine due to the first electric motor MG1 to act on the output gear 14, this is not a limitation. For example, the vehicle 10 may be a hybrid vehicle employing a configuration in which an engine is coupled directly (or indirectly via a clutch etc.) to an electric motor having a function of starting the engine without intervention of a differential mechanism such as the power distribution mechanism 16. Although the vehicle 10 is a hybrid vehicle capable of the motor running, this is not a limitation. For example, the vehicle 10 may be a vehicle including the engine running mode and the assist running mode without including the motor running mode. The vehicle 10 may not particularly be a hybrid vehicle. For example, the vehicle 10 may be a vehicle including only an engine started by a dedicated starter motor as a drive force source to perform known idle reduction. In short, the present invention is applicable as long as a vehicle includes a configuration of stopping an engine in operation when the automatic stop request is made and restarting the stopping engine when the restart request is made. Even in this way, when the restart request is made while the engine is in transition to the rotation stop state in association with the automatic stop request, both the starting shock suppression and the acceleration response can be satisfied.

Although the vibration suppression control through the electric motor MG is exemplarily described as the vibration suppression control through the second electric motor MG2 in the embodiment, this is not a limitation. For example, the vibration suppression control may be provided through the first electric motor MG1 or another electric motor may be included to provide the vibration suppression control through this electric motor. Although the drive control through PWM is employed in consideration of provision of the vibration suppression control through the electric motor MG, drive control capable of the vibration suppression control and different from the drive control through PWM may be employed. This vibration suppression control may not necessarily be provided. In this case, for example, step S30 is omitted in the flowchart of FIG. 9.

Although the power distribution mechanism 16 is a planetary gear device of a single planetary type in the embodiment, a planetary gear device of a double planetary type may be available. The power distribution mechanism 16 may be a differential gear device in which a pinion rotationally driven by the engine 12 and a pair of bevel gears engaged with the pinion are operatively coupled to the first electric motor MG1 and the output gear 14.

Although the second electric motor MG2 is coupled in a power transmittable manner to the drive wheels 38 indirectly coupled to the engine 12 as depicted in FIG. 1 in the embodiment, the second electric motor MG2 may be coupled directly or indirectly to a wheel (drive wheel) different from the drive wheels 38. In short, the drive wheels driven by the power from the engine 12 may be drive wheels separated from the drive wheels driven by the power from the second electric motor MG2.

The above is merely an exemplary embodiment and the present invention can be implemented in variously modified and improved forms based on the knowledge of those skilled in the art.

NOMENCLATURE OF ELEMENTS

10: hybrid vehicle (vehicle)
12: engine
14: output gear (output rotating member)
16: power distributing mechanism (differential mechanism)
20: transmission portion (electric differential portion)
38: drive wheels
80: electronic control device (control device)
MG1: first electric motor (differential electric motor)
MG2: second electric motor (running electric motor)

The invention claimed is:

1. A vehicle control device stopping an engine in operation when an automatic stop request is made and restarting the stopping engine when a restart request is made, wherein
when the restart request is made while the engine is in transition to a rotation stop state in association with the automatic stop request, the engine is restarted if a crank position of the engine corresponds to a stroke other than a compression stroke while the engine is continuously stopped if the crank position of the engine corresponds to the compression stroke, and wherein
the compression stroke is a preliminarily obtained stroke having a rotational resistance of the engine being a positive value and increasing toward the maximum value.

2. The vehicle control device of claim 1, comprising an electric motor suppressing vibrations generated at the restart of the engine, wherein
when the restart request is made, if the electric motor can suppress the vibrations, the engine is restarted regardless of the crank position of the engine.

3. The vehicle control device of claim 1, wherein the vehicle is a hybrid vehicle including an electric differential portion having a differential mechanism distributing power from the engine to a differential electric motor and an output rotating member and a running electric motor coupled to a drive wheel in a power transmittable manner such that a differential state of the differential mechanism is controlled by controlling an operating state of the differential electric motor, and wherein
the engine is started by rotationally driving the engine with the differential electric motor.

4. The vehicle control device of claim 2, wherein the vehicle is a hybrid vehicle including an electric differential portion having a differential mechanism distributing power from the engine to a differential electric motor and an output rotating member and a running electric motor coupled to a drive wheel in a power transmittable manner such that a differential state of the differential mechanism is controlled by controlling an operating state of the differential electric motor, and wherein
the engine is started by rotationally driving the engine with the differential electric motor.

5. The vehicle control device of claim 3, wherein the running electric motor suppresses vibrations generated at the restart of the engine due to the differential electric motor.

6. The vehicle control device of claim 4, wherein the running electric motor suppresses vibrations generated at the restart of the engine due to the differential electric motor.

* * * * *